United States Patent [19]

Eurlings et al.

[11] 3,862,055

[45] Jan. 21, 1975

[54] CATALYST PREPARATION

[75] Inventors: Jacobus J. M. G. Eurlings, Valkenburg; John W. Geus, Bilthoven; Johannes H. Ottenheym, Sittard, all of Netherlands

[73] Assignee: Slamicarbon B.V., Geleen, Netherlands

[22] Filed: Mar. 23, 1973

[21] Appl. No.: 344,081

[30] Foreign Application Priority Data

Mar. 24, 1972 Netherlands....................... 7203934

[52] U.S. Cl................ 252/476, 252/454, 252/457, 252/459, 252/463, 252/466 J, 252/471, 252/472, 252/473, 252/474, 252/475
[51] Int. Cl.............................................. B01j 11/24
[58] Field of Search.......... 252/476, 472, 471, 475, 252/459, 466 J, 455 R, 465

[56] References Cited
UNITED STATES PATENTS

| | | | |
|---|---|---|---|
| 3,133,029 | 5/1964 | Huckstra........................... | 423/213.2 |
| 3,320,182 | 5/1967 | Taylor et al....................... | 252/466 J |
| 3,637,529 | 1/1972 | Van Beek et al.................. | 252/472 |
| 3,668,148 | 6/1972 | Van Beek et al.................. | 252/455 R |
| 3,723,353 | 7/1973 | Eurlings et al..................... | 252/474 |
| 3,790,505 | 2/1974 | Casey et al. ...................... | 252/475 |

FOREIGN PATENTS OR APPLICATIONS 1,220,105   1/1971   Great Britain

OTHER PUBLICATIONS

Martell et al., Chemistry of the Metal Chelate Compounds Prentice-Hall N.Y., N.Y., 1952, p. 523–524.

*Primary Examiner*—Arthur P. Demers
*Attorney, Agent, or Firm*—Cushman, Darby & Cushman

[57] ABSTRACT

A process for the preparation of a catalyst system having a catalytically active component of an oxide, metal or alloy of one or more of the elements copper, zinc, cadmium, nickel, cobalt, iron, manganese or magnesium, homogeneously dispersed over a solid particulate inorganic thermostable carrier material, wherein the catalytically active component is precipitated onto the carrier material from an acid aqueous solution of a complex of an $\alpha$-, $\beta$-, or $\gamma$-amino acid, an aminosulphonic acid, or derivatives of such acids, with one or more of such elements, by gradually and homogeneously generating hydroxyl ions within the solution while maintaining the absence of free ammonia.

7 Claims, No Drawings

CATALYST PREPARATION

DETAILED DESCRIPTION OF THE INVENTION

This invention relates to a process for the preparation of a catalyst system having an oxide, metal or alloy of one or more of the elements copper, zinc, cadmium, nickel, cobalt, iron, manganese, or magnesium as the catalytically active component homogeneously dispersed onto a solid particulate inorganic thermostable carrier material.

It is known that hydrated metal oxides can be precipitated onto a thermostable carrier material from a solution of a compound of certain metals by the gradual generation of hydroxyl ions within the solution. See, for example, British Pat. No. 1,220,105.

However, when applied to certain metal ions such as copper, zinc, and cadmium in the form of a customary salt such as the sulphate, nitrate or chloride, this technique usually does not lead to acceptable results. In such cases, the metal ions precipitate at a relatively low pH value in the form of a basic salt, which adheres less tenaciously to customary thermostable carrier material such as silica and alumina.

The adherence between compounds of these metals and the carrier surface can be improved by effecting the precipitation at a higher pH value, but smaller catalytically active particles are produced. In order to make this precipitation to proceed at a higher pH value, it has been proposed to precipitate the catalytically active component onto the carrier material by homogeneously changing the valence of the metal ions. In the preparation of copper catalysts, for example, usable results are obtained by reducing the copper (II) tartrate complex to a copper (I) compound. In this manner, the precipitation can be carried out at pH values above about 6, and the precipitated copper (I) oxide can be made to be homogeneously distributed on the carrier material. However, caution must be taken to separate the loaded carrier material from the remaining solution in the absence of oxygen, in that the finely divided copper (I) oxide can be easily oxidized to copper (II) oxide, which tends to dissolve very rapidly in the remaining tartrate ion containing solution. Therefore, if oxygen is not excluded, a loss of copper is very liable to occur.

It has furthermore been proposed to effect the homogeneous precipitation of metal compounds, such as a copper (II) compound, onto the carrier material by injection of a metal salt solution, such as a copper (II) salt solution, below the surface of an aqueous suspension of the finely divided carrier material, while maintaining the pH at a value above about 6. This latter technique yields good results, but the rate of production is relatively low and difficult to carry out on an industrial scale.

The object of the present invention is to provide a catalyst preparation process which avoids the difficulties of the above-mentioned techniques. The present invention is particularly suited to a process for the preparation of metallic copper catalysts.

According to the present invention, a catalyst system having a catalytically active component of an oxide, metal or alloy of one or more of the elements copper, zinc, cadmium, nickel, cobalt, iron, manganese or magnesium on a thermostable carrier material can be prepared whereby the catalytically active component is homogeneously dispersed and securely adhered to the carrier material, even at a high degree of loading of the catalytically active material.

The process of the present invention is carried out by (a) forming an aqueous solution of a complex of an $\alpha$-, $\beta$-, or $\gamma$- amino acid, an amino-sulphonic acid, or derivatives of said acids, with one or more of the above catalytically active metal elements, (b) forming a suspension of a solid particulate inorganic thermostable carrier material in the solution of the metal complex, and (c) gradually and homogeneously generating hydroxyl ions in this solution-suspension until the pH reaches a value at which the complex is no longer stable and the catalytically active component will precipitate onto, and tenaciously adhere to, the carrier material, as opposed to forming free nuclei within the body of the liquid phase itself. The pH value at which the complex is no longer stable will vary depending upon the amino-acid complex chosen. However, this pH would normally be within the range of from about 5 to 10.

The process can be directly started with the aminoacid complex of the metal compound to be precipitated, but it is preferred to add the amount of amino acid needed for the complex formation to a solution of a customary salt of the metallic element concerned, e.g., the sulphate, nitrate or chloride thereof. Where the process is carried out beginning with an Fe(II) salt, care must be taken to prevent oxidation. The amino-acid complex of the catalytically active element can be present in the solution up to the point of its maximum solubility. Initially, the aqueous solution of the metal complex must of course have a pH value at which the metal complex is stable. However, the appropriate starting pH will vary depending upon the particular amino-acid complex employed.

Acceptable solutions of amino-acid complexes are aqueous solutions of a complex of $\beta$-alanine, ($NH_2CH_2CH_2COOH$), glycine ($NH_2CH_2COOH$), $\gamma$-amino-butyric acid ($NH_2CH_2CH_2CH_2COOH$), taurine ($NH_2CH_2CH_2SO_3H$) or derivatives of such acids, with one or more of catalytically active components. For the stability of the amino acids and the above-mentioned and other amino-acid complexes see "Chemistry of the Amino Acids" Vol. 1, Greenstein J. P., Winitz M., Wieg, New York, 1967, pages 617 and 618.

The amount of carrier material to be suspended in the solution depends upon the desired degree of loading of the carrier material with the catalytically active material, and may be adjusted accordingly. In using the process of the present invention, the degree of loading may be controlled to reach a very high value, i.e., up to two parts by weight of the catalytically active material for one part by weight of carrier material, in which case the catalytically active material is still present as small particles measuring, e.g., 100 A or less in diameter.

The carrier material may be selected from a wide range of preferably finely divided or particulate solid inorganic thermostable materials. By "finely divided" is here meant a material whose particles are smaller than 100 microns, but a carrier material having larger particles may also be used. The most preferred carrier materials for application in the present invention are silica, in its various modifications, and alumina.

Other carrier materials, whether synthetic or mineral, may also be employed, the choice depending upon the particular field of application for the final catalyst system.

The generation of hydroxyl ions within the solution, e.g., an in situ generation, may be effected by any known manner, such as by hydrolysis of substances capable of yielding hydroxyl ions at elevated temperatures. Good results are obtained by the addition of urea to the solution. The molecular ratio between the urea added and the amino-acid complex is preferably in the range of from about 1:1 to 20:1, a ratio of approximately 5:1 being most preferred. The hydrolysis may be carried out in the range of temperatures from approximately 60°C to above 100°C.

Other methods of generating hydroxyl ions may also be employed, such as reacting urea with nitrous acid in the presence of an alkali nitrite, or reacting nitrite ions with water as described in British Patent No. 1,220,105. Other suitable sources of hydroxyl ions are organic nitrogen compounds which, during heating in an aqueous medium, hydrolyse in the manner set forth above, such as formamide, dimethyl formamide, acetamide, dimethyl acetamide, hexamethylene tetramine, ethylene diamine or dimethyl amine.

The amount of hydrolysing material, the temperature of hydrolysis, and the time in which the hydrolysis takes place must be considered in relation to one another. It is preferable, but not essential, that these three factors be chosen such that the precipitation will be completed to about 90 percent or over within about 1 to 14 hours. To insure precipitation exclusively onto the carrier material, as opposed to forming free nuclei in the body of the solution, these three factors preferably should be balanced to gradually generate hydroxyl ions homogeneously in the solution, at a rate such that the solubility product above which nucleation of a pure precipitate is liable to occur is not exceeded.

Most important is that the stability limit of the complex during precipitation be exceeded only in a uniform and homogeneous manner throughout the body of the solution through the homogeneous formation of hydroxyl ions. Homogeneous formation of hydroxyl ions implies that the hydroxyl ion concentration is not a function of the place in the solution, but is uniform throughout the solution so that however small the volume of the solution considered, the concentration of hydroxyl ions will always be equal to that in any other particular volume of the solution. The theory behind these criteria are more fully discussed in the copending application of John W. Geus, Ser. No. 108,081 filed Jan. 20, 1971.

Another important factor is that the precipitation be carried out substantially in absence of free ammonia. If free ammonia is present, the amino-acid complex may change, in whole or in part, into other complexes. This is particularly true for salts of copper and zinc, see, e.g., Ley, H., Z. Inorganic Chem. 164 (1927), 377/406. Thus, the ammonia formed by the hydrolysis of urea must not remain behind as such in the solution. This can be accomplished, for example, by maintaining an alkali substance in the solution, notably in the form of sodium nitrite. Further, adding sodium nitrite, hydroxyl ions are formed too, whereby the quantity of urea to be added can be reduced. In practice however it has been shown that if the urea concentration is not too high the ammonia formed escapes from the liquid and undesired other complexes are not formed.

The process according to the invention is particularly suitable for the preparation of copper catalysts. More specifically, the process can be used for preparing metallic copper catalysts consisting of copper particles having an average size of approximately 75 A deposited on a thermostable carrier, e.g., on silica such as silica obtained by flame hydrolysis of silicon tetrachloride or kieselguhr on alumina, or on chromium oxide. Such a copper catalyst can be prepared, for example, by starting from the copper (II) complex of $\beta$-alanine, in which case the pH of 4-6 at the start of the precipitation is increased homogeneously throughout the bulk of the solution by elevated temperature hydrolysis of an alkali nitrite, such as sodium nitrite, until the pH reaches a value where the copper (II) complex is no longer stable. Urea may also be added to the solution as a hydroxyl ion source. Copper (II) oxide precipitates homogeneously at a pH between 7 and 8 onto the carrier material suspended in the solution, and not in the liquid phase itself, whereupon the CuO loaded carrier material is separated from the liquid in a known manner, and subsequently is washed, dried and reduced. The examples will show that the reduction can be carried out at a temperature that is relatively high for copper catalysts, clearly indicates that the carrier material is homogeneously covered with copper particles as small as 50 A.

The invention will be elucidated with reference to examples for the preparation of metallic copper catalysts. However, the application of the invention is not limited to this metal only.

EXAMPLE I

Preparation of a copper-on-silica catalyst 34.2 g of $Cu(NO_3)_2 \cdot 3 H_2O$ and 35.6 g of $\beta$-alanine ($\beta$-amino-propionic acid) were dissolved in 4 liters of demineralized water. Next, 82.8 g of $NaNO_2$ and 24 g of urea were added. This yielded a deep green solution, to which 23 g of silica "Aerosil 200" (Degussa, specific surface area 204 $m^2g^{-1}$) were added. The pH value of solution/suspension was 4.5.

The suspension was then heated up to 100°C, with simultaneous agitation. After 16 hours, the pH had increased to 7.5, and the color of the solution had changed to dark brown.

Next, the loaded carrier material was filtered off in contact with the atmosphere, and washed with approximately 6 liters of demineralized water. Hardly any copper could be detected in the filtrate. The filter residue was dried at 120° C for 20 hours.

After being dried, the product had the following composition: 31.1 % Cu, 39.3 % $SiO_2$ and a trace of $NO_3^-$, while no $Na^+$ could be demonstrated. Electronmicroscopic examination revealed that the carrier was homogeneously covered with particles smaller than 30 A. The X-ray diffraction pattern of the dried residue showed four very broad reflexes, possibly originating from CuO.

A sample of the above-mentioned material was reduced at 300° C for 16 hours in a stream of pure $H_2$. The reduced material exhibited the X-ray diffraction pattern of Cu. The broadening of the reflections pointed to a particle size of 70 A. Electronmicroscopic examination revealed that the carrier material was homogeneously covered with particles varying in size from about 50 A to 150 A.

EXAMPLE II

Preparation of a copper-on-alumina catalyst

This catalyst was prepared according to a procedure analogous to that outlined in Example I, with the difference that, instead of silica, $\gamma$-$Al_2O_3$ was used as the carrier material (specific surface area: 120 $m^2.g^{-1}$). 13 g of this carrier material was suspended in the solution. The pH of the solution/suspension was 5.3.

The suspension was heated up to approximately 100°C, with simultaneous agitation. After 48 hours, the pH had risen to 7.4, and the color of the solution had changed to dark brown. The loaded carrier material was filtered off in contact with the atmosphere and washed with 4.5 liters of demineralized water. Hardly any copper could be detected in the filtrate. The filter residue was dried at 120°C for 4 hours. The composition of the material was as follows: 40.5% wt of $Al_2O_3$ and 30.4% wt of Cu. The X-ray diffraction pattern consisted of the patterns of $\gamma$-$Al_2O_3$ and CuO. The size of the CuO particles calculated from the broadening of the reflections was approximately 75 A.

A sample of the above-mentioned material was reduced in the same way as described in Example I. This sample exhibited the diffraction pattern of Cu and $\gamma$-$Al_2O_3$. The broadening of the reflections pointed to a particle size of approximately 115 A. Electronmicroscopic examination revealed that the carrier was homogeneously covered with particles varying in size from 10 to 250 A.

EXAMPLE III

Preparation of a copper-on-alumina catalyst

The procedure of example II was repeated starting from:
40 g of $Cu(NO_3)_2.3 H_2O$
5 g of urea
14.8 g of $\beta$-alanine
23 g of $NaNO_2$
186 g of $\gamma$-$Al_2O_3$ and
3 liters of water.

The suspension was heated up to approximately 100°C, with simultaneous agitation. After 3,5 hours more than 90 percent had been precipitated. After being dried at 120°C the material contained 4,8 % wt of Cu. The size of the CuO particles calculated from the broadening of the reflections was approximately 10–20 A.

EXAMPLE IV

Preparation of a copper-on-alumina catalyst

The procedure of example II was repeated starting from:
132,3 g of $Cu(NO_3)_2 . 3 H_2O$
65,8 g of urea
97,9 g of $\beta$-alanine
227 g of $NaNO_2$
500 g of $\gamma$-$Al_2O_3$ and
3,3 liters of water.

The suspension was heated up to approximately 100°C, with simultaneous agitation. After 1 hour more than 90 % had been precipitated. After being dried at 120°C the material contained 5,1 % wt of Cu. The size of the CuO particles calculated from the broadening of the reflections was approximately 15 A.

EXAMPLE V

The same experiments as described in the foregoing examples can be carried out starting from a solution containing a soluble salt of zinc, cadmium, nickel, cobalt, iron, manganese or magnesium. These experiments result in carrier materials homogeneously covered with particles varying in size between 50 and 250 A.

What is claimed is:

1. A process for the preparation of a catalyst system having a catalytically active component of an oxide, metal or alloy of at least one element selected from the group consisting of copper, zinc, cadmium, nickel, cobalt, iron, manganese or magnesium homogeneously dispersed onto a solid particulate inorganic thermostable carrier material, which process comprises:
   a. forming an aqueous solution of a complex with an $\alpha$-, $\beta$- or $\gamma$-amino acid, or an amino-sulphonic acid with at least one of said elements and adding urea and an alkali metal nitrite to the solution;
   b. forming a suspension of said carrier material in said aqueous solution; and
   c. while agitating said suspension, gradually and homogeneously generating hydroxyl ions within said suspension by the hydrolysis of the alkali metal nitrite and the urea at elevated temperatures, substantially in the absence of free ammonia, whereby said catalytically active component is precipitated onto said carrier material as opposed to forming free nuclei within the body of said solution.

2. The process of claim 1 wherein the ratio of said catalytically active component to said carrier material is about 2:1.

3. The process of claim 1 wherein said complex is $\beta$-alanine ($NH_2CH_2CH_2COOH$), glycine ($NH_2CH_2COOH$), $\gamma$-aminobutyric acid ($NH_2CH_2CH_2CH_2COOH$), or taurine ($NH_2CH_2CH_2CSO_3H$) with at least one of said elements.

4. The process of claim 1 wherein said complex is a complex of $\beta$-alanine with copper (II).

5. The process of claim 4 wherein said alkali metal nitrite is sodium nitrite.

6. The process of claim 4 wherein the pH of the solution of said complex is initially within the range of from about 4 to 6, and is raised by said hydrolysis to a pH within the range of from about 7 to 8.

7. The process of claim 4 wherein the alkali metal nitrite is sodium nitrite.

* * * * *